(12) United States Patent
Da Costa Pito et al.

(10) Patent No.: US 8,317,256 B2
(45) Date of Patent: Nov. 27, 2012

(54) DASHBOARD CROSSBAR ASSEMBLY FOR A MOTOR VEHICLE, AND CORRESPONDING DASHBOARD DEVICE, MOTOR VEHICLE, AND MANUFACTURING METHOD

(75) Inventors: Sergio Da Costa Pito, Cergy (FR); Laurent Baudart, Fresnoy en Thelle (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/126,691

(22) PCT Filed: Oct. 12, 2009

(86) PCT No.: PCT/FR2009/052012
§ 371 (c)(1),
(2), (4) Date: Jul. 12, 2011

(87) PCT Pub. No.: WO2010/049626
PCT Pub. Date: May 6, 2010

(65) Prior Publication Data
US 2012/0001448 A1 Jan. 5, 2012

(30) Foreign Application Priority Data
Oct. 28, 2008 (FR) ...................................... 08 57324

(51) Int. Cl.
*B62D 25/08* (2006.01)

(52) U.S. Cl. ..................................... 296/193.02; 296/70
(58) Field of Classification Search .................... 296/70, 296/72, 73, 74, 193.02
See application file for complete search history.

(56) References Cited

U.S. PATENT DOCUMENTS
7,048,325 B1 * 5/2006 Sandhu .................... 296/193.02

FOREIGN PATENT DOCUMENTS
| EP | 1 203 711 | 5/2002 |
|---|---|---|
| WO | WO 03/031746 | 4/2003 |
| WO | WO 2005/028239 | 3/2005 |
| WO | WO 2008/049985 | 5/2008 |
| WO | WO 2008/110733 | 9/2008 |

OTHER PUBLICATIONS

International Search Report, issued in corresponding International Application No. PCT/FR2009/052012.
Written Opinion, issued in corresponding International Application No. PCT/FR2009/052012.

* cited by examiner

*Primary Examiner* — Joseph Pape
(74) *Attorney, Agent, or Firm* — Kenyon & Kenyon LLP

(57) ABSTRACT

An assembly includes: two crossbars extending substantially in parallel to each other; and two securing members for securing onto the vehicle body, each securing member being secured to one end of each crossbar so as to connect the two crossbars together. The two securing members are made of the same material as the two crossbars.

13 Claims, 2 Drawing Sheets

DASHBOARD CROSSBAR ASSEMBLY FOR A MOTOR VEHICLE, AND CORRESPONDING DASHBOARD DEVICE, MOTOR VEHICLE, AND MANUFACTURING METHOD

FIELD OF THE INVENTION

The present invention relates to a dashboard crossbar assembly for a motor vehicle, and corresponding dashboard device, motor vehicle, and manufacturing method.

BACKGROUND AND SUMMARY

Example embodiments of the present invention provide a dashboard crossbar assembly for a motor vehicle, comprising:
  two crossbars extending substantially in parallel to each other; and
  two fastening members on the vehicle body, each fastening member being fastened to one end of each crossbar so as to connect the two crossbars together.

An assembly of this type is known in which the assembly of the different pieces is done by welding with addition of material.

Moreover, reinforcing elements are provided so as to balance the loss of rigidity of the assembly due to the discontinuity of the pieces.

The present invention aims to propose an assembly having a reduced weight and that is simple and inexpensive to manufacture.

To that end, the present invention relates to a dashboard crossbar assembly for a motor vehicle of the aforementioned type, wherein the two fastening members are integral with the two crossbars.

The assembly according to the present invention may include one or several of the following features:
  each fastening member is connected to each crossbar by a connecting portion integral with the corresponding fastening member and crossbar, the connecting portion being plastically deformed so as to form a bent connecting portion;
  one of the two crossbars and the two fastening members includes two segments fastened to each other by welding;
  each fastening member includes at least one crushed portion and a passage orifice formed in the crushed portion, the passage orifice being adapted to receive a fastening element secured to the vehicle body;
  the fastening members are longitudinal and/or transverse fastening members on the vehicle body;
  the assembly is formed by a single tube including at least four bendings;
  the tube includes at least one additional bending for adapting to the geometry of the environment;
  the tube has a variable wall thickness; and
  the tube has a variable cross-section.

The present invention also relates to a dashboard device for a motor vehicle, wherein the dashboard device comprises a dashboard crossbar assembly as previously described and at least two fastening pieces on the vehicle body added on the crossbars.

The present invention also relates to a motor vehicle, wherein the motor vehicle comprises a dashboard device as defined above, the dashboard crossbar assembly being fastened by the fastening pieces and members on the vehicle body.

The present invention also relates to a method for manufacturing a dashboard crossbar assembly as previously described, wherein the method comprises the following steps:
  bending of a tube at the junction between the crossbars and the fastening members so as to form connecting portions; and
  fastening the ends of the tubes to each other by welding.

The method according to the present invention may include the feature according to which the method comprises a step for crushing the tube so as to form crushed portions, and a step for making a passage orifice in the crushed portions, the passage orifice being adapted to receive a fastening element secured to the vehicle body.

The present invention will be better understood upon reading the following detailed description, provided solely as an example and done in reference to the appended drawings.

DETAILED DESCRIPTION

In order to simplify the following description, the Figures were oriented along the system of axes X, Y, Z defining the usual orientation of a motor vehicle, and in which:
  the X axis is the longitudinal axis of the vehicle, oriented from back to front;
  the Y axis is the transverse axis oriented from right to left; and
  the Z axis is the vertical axis oriented from bottom to top.

The position and orientation terms used hereafter are used relative to this system of axes.

Figure 1:
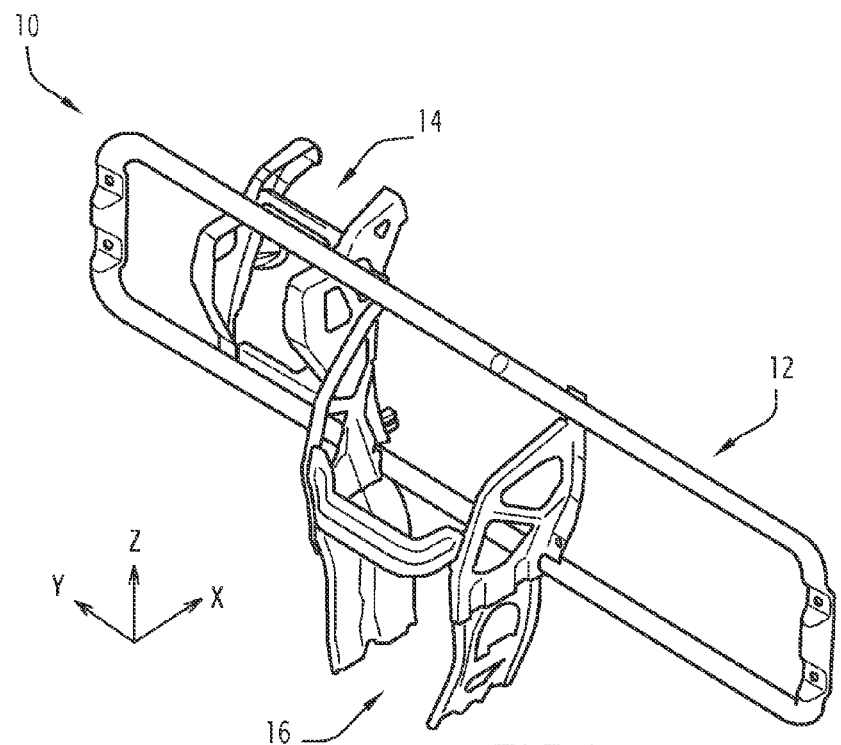
FIG. 1 is a perspective view of the back of a device for a dashboard of a motor vehicle equipped with a dashboard crossbar assembly according to the present invention.

FIG. 1 diagrammatically illustrates a dashboard device 10 for a motor vehicle comprising a dashboard crossbars assembly 12 and two pieces 14, 16 for connecting the vehicle body fastened on the assembly 12.

Figure 2:
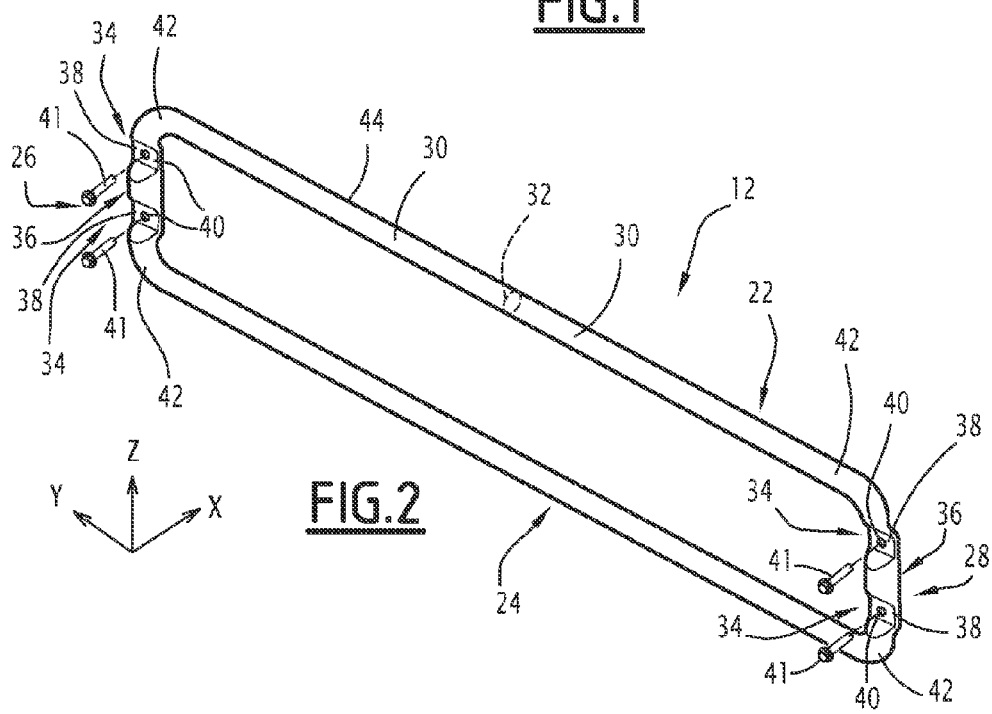
FIG. 2 is a perspective view of the dashboard crossbar assembly of FIG. 1.

As better shown in FIG. 2, the assembly 12, with a rectangular general shape, comprises an upper crossbar 22, a lower crossbar 24, a left fastening member 26, and a right fastening member 28 to fix on the vehicle body by a screw/nut assembly 41 extending along X.

The upper 22 and lower 24 crossbars extend substantially parallel to each other and are arranged substantially transversely one below the other in the vehicle.

The two crossbars 22, 24 are identical, tubular, and have a substantially circular constant cross-section and a substantially constant wall thickness.

The upper crossbar 22 includes two segments 30 placed one in the extension of the other and fastened edge to edge by welding, the weld 32 being shown in broken lines in FIG. 2.

The left 26 and right 28 fastening members extend substantially parallel to each other and are arranged substantially vertically in the vehicle, substantially perpendicular to the crossbars 22, 24.

Figure 3:
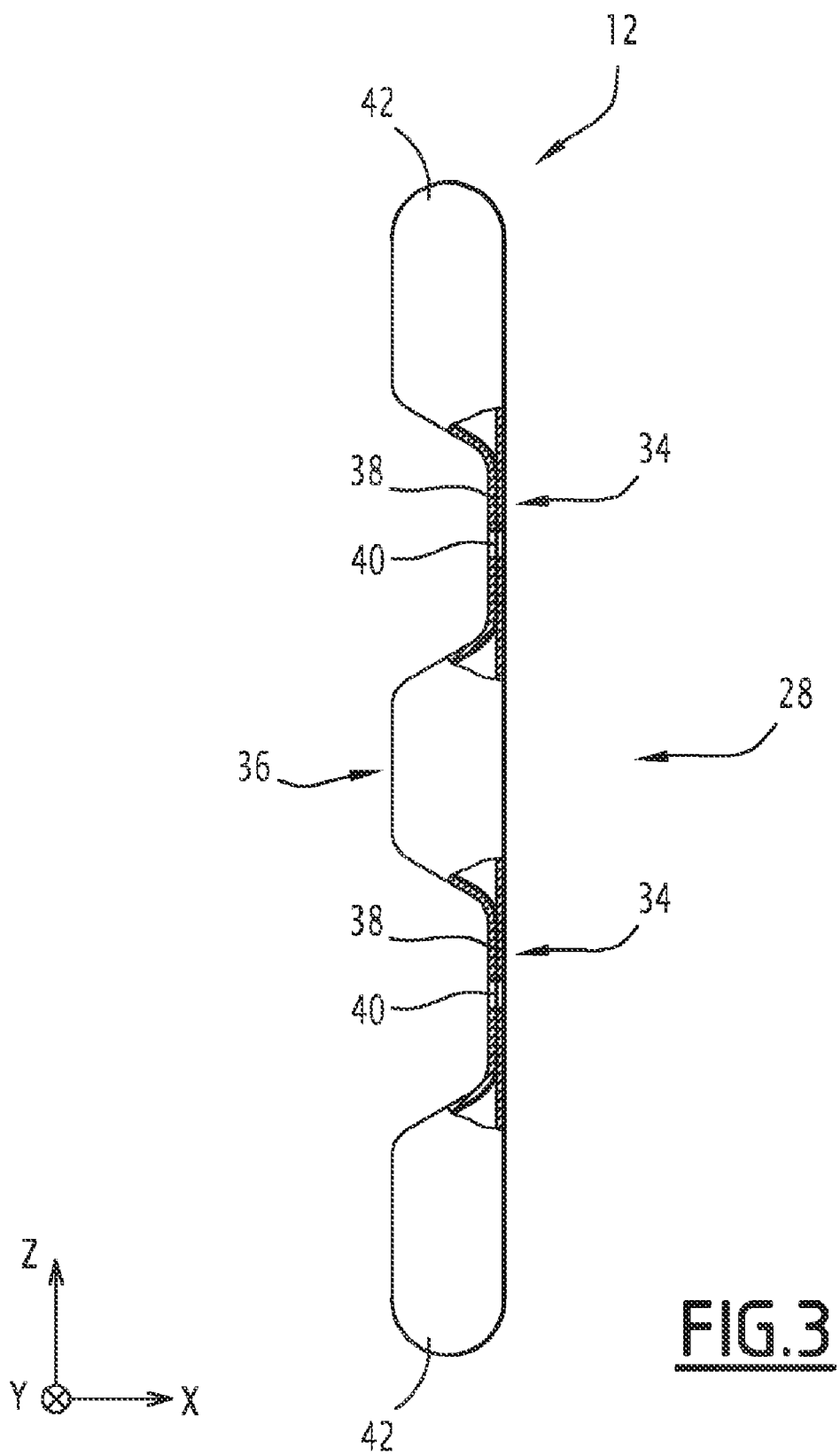
FIG. 3 is a side view with partial cutaways of the dashboard crossbar assembly of FIG. 1.

The two fastening members 26, 28 are identical and each include two crushed, or flattened, portions 34 connected to each other by a tubular portion 36 with a substantially circular constant cross-section corresponding to the cross-section of the crossbars 22, 24 and with a substantially constant wall thickness (FIG. 3).

Each crushed portion 34 forms a substantially flat double wall 38 in which a passage orifice 40 is formed and adapted to receive a fastening element to the vehicle body, such as a screw/nut assembly 41 extending along X.

The double walls 38 extend substantially parallel to the transverse direction Y of the vehicle, thereby forming longitudinal fastening walls.

Alternatively, the left member 26 and/or the right member 28 are fastening members to fix on the vehicle body by a screw/nut assembly 41 extending along Y, the double walls 38 extending substantially parallel to the longitudinal direction X of the vehicle, thereby forming transverse fastening walls.

Each fastening member 26, 28 is secured by its ends to ends of each crossbar 22, 24 so as to connect the two crossbars 22, 24 to each other to form a frame.

The assembly 12 thus defines four connecting portions 42 between each crossbar 22, 24 and each fastening member 26, 28.

The connecting portions 42 are integral with the crossbars 22, 24 and the fastening members 26, 28, and are plastically deformed so as to form connecting portions 42 bent with an angle substantially equal to 90°.

In particular, the assembly 12 is formed by a single tube 44 including four bendings, corresponding to the connecting portions 42, and whereof the ends, corresponding to the edges of the sections 30 of the upper crossbar 22, are fastened to each other by welding so as to form a single-tube frame.

The device 10 comprises a first piece 14 for connecting to a lower window crossbar and/or a steering column of the vehicle, and a second piece 16 for connecting to a MacPherson strut.

The pieces 14 and 16 are fastened on the two crossbars 22, 24, on their left portion for the first piece 14 and on their central portion for the second piece 16.

The method for manufacturing the assembly 12 will now be described.

From a single substantially rectilinear tube 44, with a substantially circular constant cross-section and a substantially constant wall thickness, four successive bendings are made at the junction between the crossbars 22, 24 and the fastening members 26, 28 so as to form the four connecting portions 42.

The ends of the tube 44 are then fastened to each other by welding so as to obtain a single-tube frame. The weld 32 can be placed at any location on the frame depending of the zone where the ends of the tube 44 join together, i.e., on one of the two crossbars 22, 24 and the two fastening members 26, 28. The fastening members 26, 28 are then crushed to form the flat double walls 38 and a passage orifice 40 is formed in each of these double walls 38. The crushed portions 34 are for example obtained by stamping.

The present invention therefore proposes a dashboard crossbar assembly for a motor vehicle formed by a single-tube frame that is simple and inexpensive to manufacture.

Furthermore, due to the integration of different pieces, the assembly according to the present invention has a low mass and a reduced assembly time.

Alternatively, the tube 44 may have a variable cross-section and/or a variable wall thickness.

Still alternatively, the tube 44 forming the frame may include at least one additional bending to adapt to the geometry of the environment of the assembly 12, for example, so as to bypass an airbag module.

In another alternative, the left fastening member 26 and/or the right fastening member 28 may include a single crushed portion 34 or more than two crushed portions 34, and the respective double walls 38 extend substantially parallel to the transverse direction Y of the vehicle and/or substantially parallel to the longitudinal direction X of the vehicle.

The invention claimed is:

1. A dashboard crossbar assembly for a motor vehicle, comprising:
    two crossbars extending substantially parallel to each other; and
    two fastening members integral with the two crossbars so as to obtain a single tube frame and configured to be coupled to a vehicle body of the motor vehicle, each fastening member being connected to a respective end of each crossbar to connect the two crossbars to each other.

2. The assembly according to claim 1, wherein each fastening member is connected to each crossbar by a connecting portion integral with the corresponding fastening member and crossbar, the connecting portion being plastically deformed such that the connecting portion forms a bend.

3. The assembly according to claim 1, wherein (a) one of the two crossbars includes two segments fastened to each other by welding or (b) one of the two fastening members includes two segments fastened to each other by welding.

4. A dashboard crossbar assembly for a motor vehicle, comprising:
    two crossbars extending substantially parallel to each other; and
    two fastening members integral with the two crossbars and configured to be coupled to a vehicle body of the motor vehicle, each fastening member being connected to a respective end of each crossbar to connect the two crossbars to each other;
    wherein each fastening member includes at least one crushed portion and a passage orifice formed in the crushed portion, the passage orifice being adapted to receive a fastening element securable to the vehicle body.

5. The assembly according to claim 1, wherein the fastening members are longitudinal and/or transverse fastening members on the vehicle body.

6. A dashboard crossbar assembly for a motor vehicle, comprising:
    two crossbars extending substantially parallel to each other; and
    two fastening members integral with the two crossbars and configured to be coupled to a vehicle body of the motor vehicle, each fastening member being connected to a respective end of each crossbar to connect the two crossbars to each other:
    wherein the assembly is formed from a single tube including at least four bends.

7. The assembly according to claim 6, wherein the tube includes at least one additional bend for adapting to the geometry of an environment of the assembly when disposed in the motor vehicle.

8. The assembly according to claim 6, wherein the tube has a variable wall thickness.

9. The assembly according to claim 6, wherein the tube has a variable cross-section.

10. A dashboard device for a motor vehicle, comprising:
the dashboard crossbar assembly according to claim 1; and
at least two fastening pieces on the vehicle body and coupled to the crossbars.

11. A motor vehicle, comprising:
the dashboard device according to claim 10, the dashboard crossbar assembly being fastened to the vehicle body by the fastening pieces and the fastening members.

12. A method for manufacturing a dashboard crossbar assembly including two crossbars extending substantially parallel to each other, and two fastening members integral with the two crossbars and configured to be coupled to a vehicle body of the motor vehicle, each fastening member being connected to a respective end of each crossbar to connect the two crossbars to each other, the method comprising:
bending a tube that forms the crossbars and the fastening members to form connecting portions at junctions between the crossbars and the fastening members; and
fastening ends of the tube to each other by welding.

13. The method according to claim 12, further comprising:
crushing the tube to form crushed portions; and
forming a passage orifice in the crushed portions, the passage orifice being configured to receive a fastening element securable to the vehicle body.

* * * * *